Mar. 13, 1923.
E. LANGBEIN
INTERCHANGEABLE BLADE OPERATING KNIFE
Filed July 9, 1921
1,448,305
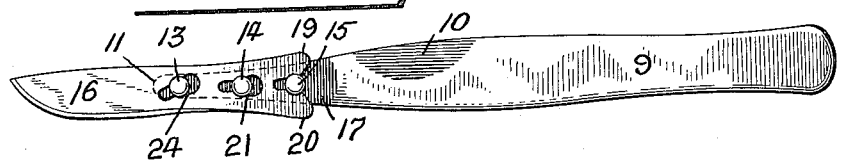
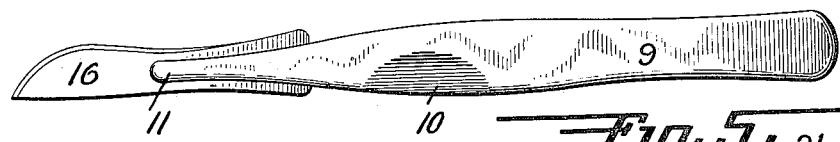
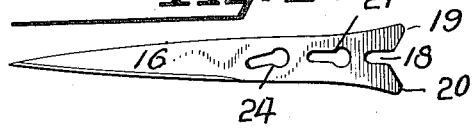
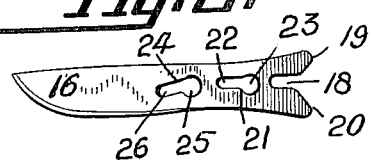
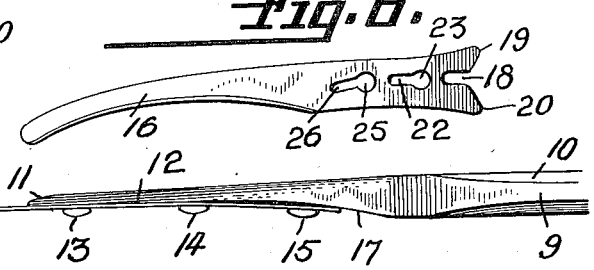
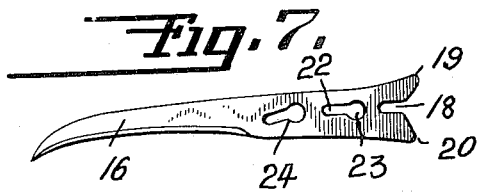
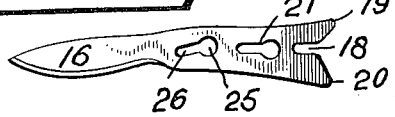
Inventor
EDWARD LANGBEIN
By his Attorney Patented Mar. 13, 1923.

1,448,305

UNITED STATES PATENT OFFICE.

EDWARD LANGBEIN, OF BROOKLYN, NEW YORK.

INTERCHANGEABLE-BLADE-OPERATING KNIFE.

Application filed July 9, 1921. Serial No. 483,495.

*To all whom it may concern:*

Be it known that EDWARD LANGBEIN, citizen of the United States, residing at 34 Ridgewood Avenue, Brooklyn, in the county of Kings and State of New York, has invented certain new and useful Improvements in Interchangeable-Blade-Operating Knives, of which the following is a specification.

My invention relates to knives, and particularly to the kind that are used by surgeons when performing an operation, where it is not only necessary to have a number, but also a variety of different knives for the various parts to be operated upon.

The prime object of my invention is to supply the surgeon with a holder or handle that will be adapted to receive and hold secure thereto, by suitable locking means, interchangeable blades, the latter may be of any of the well known variety, and at the same time to discard the old fashioned operating knife.

Another object is to provide a surgical knife handle adapted, as noted above, to receive interchangeable blades of the same or of different variety, that will reduce the number of knives a surgeon must provide himself, when such blades and handles are permanently secured together.

With my improved handle or holder the surgeon may be provided with a plurality of each style of blades, so that they may be readily and securely attached to the handle with the least possible trouble, and which after the operation has been performed, such blades may as readily detached from the handle or holder and thrown away.

With these and other objects in view, the improvement consists in the construction, combination and arrangement of the parts, as will be hereinafter more fully described, illustrated in the accompanying drawing, and pointed out in the claims hereunto appended.

The invention as at present preferred will be more clearly understood by reference to the accompanying drawing which illustrates merely an example of means for putting my improvement into practice, and wherein, Figure 1 illustrates a side view of the holder or handle provided with an interchangeable blade; Figure 2 a rear side view of the same; Figure 3 a detached view of one of the blades; Figure 4 a top plan view showing relation of the detachable blade to the handle; and Figures 5 to 8 illustrate a few of the many variety of blades that may be provided with my improved holder for the same.

The same reference characters will refer to the same parts on the several figures. Referring now particularly to Figures 1, 2 and 4, it will be seen that the holder 9, is provided with every convenience for the proper holding of the same, such as the finger clamping depression 10, from which point the handle tapers into a long extending tongue or finger 11, which from its extreme forward end may be flattened as shown at 12, and provided with a plurality of buttons, 13, 14 and 15, that provide just enough space between the head 13, and the flat 12, as to allow fitted and securely held therebetween a suitable detachable blade 16. The flat part of the finger 11, extends just beyond the second button, parallel with the central line of the length of said holder, where it gradually inclines upward as shown at 17, to the thickness of the handle, which incline as will be noted further on in the description acts as one of the means for holding the interchangeable blades 16, secure to the holder 9 when properly placed herein.

The blades 16 are of tempered flexible steel, that is to say they are of such thickness to stand any desired strain that may be exerted upon them when in such operation, and yet possessing that flexibility that may be also desired for the surgeon's particular purpose. Said blade is provided with a slot 18, having suitable beveled tongues or extensions 19 and 20, from which the lines of the blade follows the lines of the finger 11, to the end of the blade no matter what its shape may be. Just beyond the slot is an eyelet buttonhole 21, the slot 22 of such buttonhole runs parallel with the before mentioned slot 18, while the eyelet portion 23 is of sufficient size to allow the head of the button 14 to pass through, while just beyond is located another eyelet buttonhole 24, the eyelet 25 of which is in line with the slots 18 and 22, but the slot 26 of which exends at an angle to the before mentioned slots 18 and 22. Each of the eyelet buttonholes 21 and 24 have the points where the eyelet connects with the slot, rounded off so that the neck of the button will readily ride within such slot.

As has been noted the handle or holder is so machined as to form a slight incline 17, which when the blade 16 has been applied, the buttons 13, 14 and 15, registering respectively with the eyelets 23 and 25, and the bevel tongues or fingers 19 and 20 ready to act upon the incline 17, when the pressure is applied to the free end of the blade. As will be noted by referring to Figure 4 the tongues or fingers 19 and 20 are forced to bend and assume the curvature of such incline 17, while at the same time the head of the button 15 is exerting a constant pressure upon its upper face causing a secure frictional lock. At the same time, the button 13 and 14 has entered the eyelet 23 and 25 and the rearward pressure of the blade has caused the neck of said button 14 to ride along the slot 22, while the neck of button 13 attempts to ride along the angular slot 26. By reason of the slots 18 and 22 being in alignment and slot 26 an angle thereto causes a very secure bind, and by reason of the heads of the buttons 13 and 14 fitting so close to, and holding the blade to the flat of the handle, causes a very secure frictional lock, which firmly holds the blade secure to the holder and will not permit the same to become detached no matter how great a pressure is brought to bear. The firmness with which the blade is held to the handle is further increased by the slight bevel 17 before referred to which is provided at the base of the taper on the handle, which serves as a wedge. As may be noted the blade may be as readily removed by a slight pull forward, which will dislodge the locking parts of each button from the locking parts of each of the slots 18, 22 and 26.

The buttons, 13, 14 and 15, with the handle 9, are so designed that there are no crevices, corners or edges which would present any difficulties in the sterilization of the same, nor with the use of the instrument when the blade is attached, the buttons as before noted fitting so close to the blade, and the blade so close to the handle that all chances for injury in any way is reduced to a minimum. Even the rear of the finger 11, is so rounded and tapered that it really forms a reinforcement for the blade 16 when inserted and locked thereto.

Like all other arts, the surgeon when about to perform an operation requires a great variety of knives, these take up a great amount of space and cause a great amount of trouble in sterilizing and keeping the same sharp and other attention required of such implements, all of this is obviated when he uses my handle or holder and provides himself with the requisite number of the handle, and at the time apply the necessary kind of blades to said handle for such particular purposes as he may desire, he having a suitable number of each of the several kinds or styles of blades as may be wanted for any particular case.

I am aware that knives have been designed to use detachable blades, but they have such defects that causes them to be more costly for one reason or another, while not possessing that amount of cutting surface that is very desirable by a surgeon, and for these and other reasons such knives have never come into popular use by the profession.

In accordance with the provisions of the patent statutes, I have herein described the principle of my invention or improvement which I now consider to represent the best embodiment thereof, but I desire to have it understood that the same is only illustrative and that the same results may be attained by designing the parts in other ways, but all such are intended to come within the scope of the claims.

Having thus described my invention, what I claim as new and desire to secure by Letters Patent is:

1. In a knife of the character described, a handle provided with a flat surface at one side, a blade adapted to engage said side and having openings therein, retaining devices carried by the handle and projecting from said flat face for engagement through the openings in the blade, said flat face being curved outwardly and flaring at its inner end for flexing said blade and bending the same against said fastening devices upon the longitudinal sliding movement of the blade for holding the latter to the handle.

2. In a knife of the character described, a handle having a tapering projecting portion with a flat side and providing a curved inner end to the flat side, a plurality of headed studs projecting from said flat side of the handle, and a blade having slots therein for the reception of said studs, said slots extending in a general longitudinal direction in the blade whereby said blade may be slid longitudinally against said flat face for engagement beneath the heads of said studs whereby said blade may be positioned laterally for binding engagement with the studs.

3. In a knife of the character described, a handle having a projecting portion with a flat face and said projecting portion tapering toward its outer end whereby the flat face is provided with a cam portion at its inner end and said cam portion gradually merging into the adjacent side of the handle, a plurality of headed studs projecting from said flat face, and a blade having a plurality of keyhole slots therein for receiving said headed studs and said blade being adapted for longitudinal sliding movement against said face and cam portion thereof whereby to flex said blade and bind the same beneath the heads of said studs, one of said keyhole slots being arranged with its longitudinal axis at an angle to the longitudinal axis of the blade whereby to bind said blade against edgewise shifting under pressure.

4. In a knife of the character described, a handle having a flat side with an outwardly curved inner end portion, a longitudinal row of headed studs projecting from said flat side, and a blade having a forked inner end and a plurality of keyhole slots therein for receiving said studs, said slots extending in a general longitudinal direction in the blade and adapted to receive the studs by a longitudinal sliding movement of the blade against said flat side, the curved inner end of the flat side being adapted to flex the blade and bind it beneath the heads of said studs and said curved inner end of the flat side being uninterrupted whereby the blade may be shifted inwardly to various degrees to take up wear during use of the knife, one of said slots having its longitudinal axis inclined toward the cutting edge of the knife whereby to bind the blade in position by pressure upon said cutting edge to prevent loosening of the blade during use of the knife.

In testimony whereof I affix my signature.

EDWARD LANGBEIN.